(12) United States Patent
Anand et al.

(10) Patent No.: US 8,508,108 B2
(45) Date of Patent: Aug. 13, 2013

(54) POLYMER METAL COMPOSITE MEMBRANES

(75) Inventors: Sandeep Venkit Anand, Bangalore (IN); Debiprosad Roy Mahapatra, Bangalore (IN)

(73) Assignee: Indian Institute of Science, Bangalore, Karnataka (IN)

( * ) Notice: Subject to any disclaimer, the term of this patent is extended or adjusted under 35 U.S.C. 154(b) by 267 days.

(21) Appl. No.: 13/161,218

(22) Filed: Jun. 15, 2011

(65) Prior Publication Data
US 2011/0241490 A1     Oct. 6, 2011

Related U.S. Application Data

(63) Continuation of application No. 12/718,159, filed on Mar. 5, 2010, now Pat. No. 7,982,371.

(51) Int. Cl.
*H01L 41/113* (2006.01)
*H01L 41/047* (2006.01)
*H01L 41/18* (2006.01)

(52) U.S. Cl.
USPC ............ 310/339; 310/363; 310/365; 310/800

(58) Field of Classification Search
USPC .................................. 310/339, 363–365, 800
See application file for complete search history.

(56) References Cited

U.S. PATENT DOCUMENTS

| 3,282,875 | A | 11/1966 | Connolly et al. |
| 4,290,859 | A * | 9/1981 | Oda et al. ..................... 205/109 |
| 6,682,500 | B2 | 1/2004 | Soltanpour et al. |
| 6,935,263 | B1 | 8/2005 | Bandyopadhyay |
| 7,240,655 | B2 | 7/2007 | Pelrine et al. |
| 7,633,214 | B2 * | 12/2009 | Okamura et al. ............. 310/363 |
| 7,982,371 | B1 * | 7/2011 | Anand et al. .................. 310/339 |
| 8,123,983 | B2 * | 2/2012 | Komatsu et al. ............. 252/500 |
| 2007/0241641 | A1 * | 10/2007 | Kato et al. .................... 310/332 |

(Continued)

FOREIGN PATENT DOCUMENTS

| WO | 2008064689 A2 | 6/2008 |
| WO | 2009063610 A1 | 5/2009 |

OTHER PUBLICATIONS

Chandrakasan A, Amirtharajah R, Cho S H, Goodman J, Konduri G, Kulik J, Rabiner W, and Wang A 1999 Design Considerations for Distributed Microsensor Systems Proceedings of the 21st IEEE Annual Custom Integrated Circuits Conference 279-286.

(Continued)

*Primary Examiner* — Thomas Dougherty
(74) *Attorney, Agent, or Firm* — Foley & Lardner LLP

(57) ABSTRACT

Systems and methods of harvesting and converting naturally occurring energy are described that include exposing a material to an ambient condition and harvesting at least a portion of energy that is created. Energy harvesting from fluidic and flow environments or vibration can be accomplished using types of energy harvesters, such as flexible polymers. Active materials or Electro-Active Polymer (EAP)-metal composite thin films like Ionic Polymers, Piezoceramic materials, and electromagnetic systems may be used as mechanical to electrical energy transducers. One type of an ionic EAP is ionic polymer-metal composite (IPMC), which includes a base polymer membrane that may be coated with a metal to act as a surface electrode. The surface electrode may be silver (Ag) nanoparticles. The silver nanoparticle functionalized IPMC can be used to convert mechanical vibrations and fluidic flow to electrical energy to power wireless devices and microelectronic systems, for example.

18 Claims, 11 Drawing Sheets

(56) References Cited

U.S. PATENT DOCUMENTS

| | | | |
|---|---|---|---|
| 2008/0093849 A1 | 4/2008 | Pelrine et al. | |
| 2008/0277631 A1* | 11/2008 | Smela et al. | 252/520.3 |
| 2009/0050487 A1 | 2/2009 | Fang et al. | |
| 2009/0105400 A1 | 4/2009 | Komatsu et al. | |
| 2009/0142584 A1* | 6/2009 | Bedel et al. | 428/328 |
| 2009/0184923 A1 | 7/2009 | Schena | |
| 2009/0241537 A1 | 10/2009 | Browne et al. | |
| 2010/0044212 A1 | 2/2010 | Kim et al. | |
| 2010/0055378 A1* | 3/2010 | Kim et al. | 428/68 |
| 2010/0148164 A1 | 6/2010 | La Rosa et al. | |
| 2010/0164330 A1 | 7/2010 | Komatsu et al. | |
| 2010/0271755 A1 | 10/2010 | Kaminska et al. | |
| 2010/0308691 A1 | 12/2010 | Hayamizu | |
| 2011/0050048 A1* | 3/2011 | Suda et al. | 310/363 |
| 2012/0043858 A1* | 2/2012 | Mahapatra et al. | 310/339 |

OTHER PUBLICATIONS

Sodano H A, Inman D J, and Park G 2004 A review of Power Harvesting from Vibration using Piezoelectric Materials Shock and Vibration Digest 36 197-205.

Shahinpoor M and Kim K J 2001 Ionic polymer-metal composites: I. Fundamentals Smart Materials and Structures 10 819-833.

Shahinpoor M and Kim K J 2003 Ionic polymer-metal composites: II. Manufacturing Techniques Smart Materials and Structures 12 65-79.

Shahinpoor M, Bar-Cohen Y, Simpson J, Smith J 1998 Ionic polymermetal composites as biomimetic sensors, actuators and artificial muscles—a review Smart Materials and Structures 7 15-30 [7].

Mallavarapu K and Leo D J 2001 Feedback control of the bending response of ionic polymer actuators Journal of Intelligent Material Systems and Structures 12 143-155.

Farinholt K and Leo D J 2004 Modeling of Electromechanical charge sensing in Ionic polymer transducers Mechanics of Materials 36 421-433.

Nemat-Nasser S 2000 Electromechanical response of ionic polymer-metal composites Journal of Applied Physics 87 3321-3331.

Nemat-Nasser S 2002 Micromechanics of actuation of Ionic polymer-metal composites Journal of Applied Physics 92 2899-2920.

Brufau-Penella J, Puig-Vidal M, Giannone P, Graziani S and Strazzeri S 2008 Characterization of the harvesting capabilities of an ionic polymer metal composite device Smart Materials and Structures 17 015009.

Roundy S, Wight P K and Rabaey J 2003 A study of low level vibrations as a power source for wireless sensor nodes Computer Communications 26 1131-1144.

Ericka M, Vasic D, Costa F and Poulain G 2006 Predictive energy harvesting from mechanical vibration using a circular piezoelectric membrane IEEE Ultrasonics Symposium 2005 2 946-949.

Kang I, Heung Y Y, Jay Kim H, Lee J W, Gollapudi R, Subramaniam S, Narasimhadevara S, Hurd D, Kirikera G R, Shanov V, Schulz M J, Shi D, Boerio J, Mall S and Ruggles-Wren M 2006 Introduction to carbon nanotube and nanofiber smart materials Composites : Part B 37 382-394.

Brian Landi J, Ryne Raffaelle P, Michael Heben J, Jeffrey Alleman L, Vanderveer W, and Gennett T 2002 Single Wall Carbon Nanotube-Nafion Composite Actuators Nano Letters 211 1329-1332.

Kundu S, Leonardo Simon C, Fowler M and Grot S 2005 Mechanical properties of Nafion electrolyte membranes under hydrated conditions Polymer 46 11707-11715.

S. V. Anand, et al. "Energy harvesting using Ag nanoparticle coated ionic polymer-metal composites,"IISc Centenary International Conference and Exhibition on Aerospace Engineering ICEAE 2009, May, 18-22, 2009, Bangalore, India.

B. Ahish, et al., "Coupled electro-mechanical response of an electroactive polymer cantilever structure and its application in energy harvesting,", Proc. of SPIE Smart Structures/NDE Conference, Mar. 8-12, 2009, San Diego, California, USA, 7287, 2009.

S.V. Anand, et al., "Energy harvesting using ionic electro-active polymer thin film with Ag-based electrodes," IOP Publishing, Smart Materials and Structures, Jan. 18, 2010.

Bar-Cohen Y, "Electroactive Polymer (EAP) Actuators as Artificial Muscles—Reality, Potential,and Challenges" SPIE Press, Bellingham, WA, 2001, chapter 1.

Newbury K M, et al., "Electromechanical modeling and characterization of ionic polymer benders", Journal of Intelligent Material Systems and Structures, vol. 13, Jan. 2002, pp. 51-60.

Tadokoro S, et al., "Modeling of Nafion-Pt composite actuators by ionic motion" Proceedings of SPIE, vol. 3987, (2000) , pp. 92-102.

Kim H W, et al., "Energy harvesting using a piezoelectric cymbal transducer in dynamic environment", Japanese Journal of Applied Physics, vol. 43, (2004) pp. 6178-6183.

Johnson T J, et al., "Energy harvesting from mechanical vibrations using piezoelectric cantilever beams", Proceedings of SPIE, vol. 6169, (2004) pp. 61690D-1-61690D-12.

Branco, P.J.C., and Dente, J.A., "Derivation of a Continuum Model and Its Electric Equivalent-Circuit Representation for The Ionic Polymer-Metal Composite (IPMC) Electromechanics," Smart Materials and Structures, vol. 15(2), pp. 1-38.

* cited by examiner

POLYMER METAL COMPOSITE MEMBRANES

CROSS-REFERENCE TO RELATED APPLICATION

The present disclosure claims priority to U.S. patent application Ser. No. 12/718,159, filed on Mar. 5, 2010, the entire contents of which are herein incorporated by reference.

BACKGROUND

Traditionally, electrical power has been generated in large, centralized plants powered by fossil fuels, nuclear fission or flowing water, for example. Input fuel to such large scale power generation requires oil or coal, for example, which may not be readily available in all areas of the world.

Energy harvesting or energy scavenging from existing environmental sources has become an interest due to dwindling natural resources around the world. Energy harvesting is a process by which energy is derived from external sources (e.g., solar power, thermal energy, wind energy, salinity gradients, and kinetic energy), captured, and/or stored. In contrast to traditional electrical power plants, fuel for energy harvesters is naturally present. For example, temperature gradients exist from operation of a combustion engine, and in urban areas, large amounts of electromagnetic energy is present in the environment due to radio and television broadcasting. Thus, large-scale ambient energy, such as sun, wind, and tides is widely available; however, such energy may not be effectively captured with much efficiency or at low costs.

Even though energy harvesters fueled by ambient energy may not produce sufficient energy to perform mechanical work, small amounts of power can be generated. Harnessing ambient mechanical vibrations to produce sustainable power sources may have several applications in aerospace and outer space, for example, where ambient mechanical vibrations are plentiful. Other applications that may be pursued include using scavenged energy to power remote wireless sensors that have applications in structural health monitoring (SHM), and also to power micro-electromechanical systems (MEMS), for example. Still further, energy harvesting may be useful when applied to small, wireless autonomous devices, such as those used in wearable electronics and wireless sensor networks.

SUMMARY

In one aspect, an energy harvesting device is described. The energy harvesting device includes an ionic polymer-metal composite (IPMC) thin film including a first and a second surface, and metal electrodes coupled to the first and the second surface. The metal electrodes are silver nanoparticle coatings that are homogenously dispersed on the first and the second surface. An electric potential develops between the metal electrodes when the IPMC thin film is subjected to a bending motion.

In another aspect, an energy harvesting device is described that includes an ionic polymer-metal composite (IPMC) thin film including a first surface and a second surface, and a metal electrode coupled to the first surface. The metal electrode is a silver nanoparticle coating that is homogenously dispersed on the first surface to form a substantially uniform coating. The energy harvesting device further includes a graphitic or carbon coating coupled to the second surface. An electric potential develops between the metal electrodes when the IPMC thin film is subjected to a bending motion.

In still another aspect, a method of forming an energy harvesting element is described. The method comprises heat treating an ionic polymer-metal composite (IPMC) thin film, and placing a mask on a portion of a first surface and on a portion of a second surface of the IPMC thin film. The method also comprises depositing a silver nanoparticle electrode coating on the first surface and on the second surface of the IPMC thin film so as to form substantially uniform electrode coatings, and removing the mask from the first surface and the second surface of the IPMC thin film.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
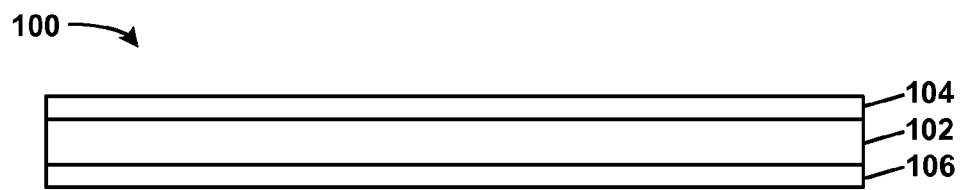
FIG. 1A illustrates a side view of an example energy harvesting element.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and are made part of this disclosure.

In example embodiments, systems and methods of harvesting and converting naturally occurring energy are described that include exposing an active material to an ambient activation condition and harvesting at least a portion of energy that is created. For example, energy harvesting from fluidic and flow environments or vibration can be accomplished using types of energy harvesters, such as flexible polymers. Active materials or Electro-Active Polymer (EAP)-metal composite thin films like Ionic Polymers, Piezoceramic materials, and electromagnetic systems may be used as mechanical to electrical energy transducers. For example, EAP films respond to electrical stimulation with a change in shape and size and are classified based on actuation mechanism as electronic or ionic EAP.

One example of a specific type of an ionic EAP is ionic polymer-metal composite (IPMC), which includes a base polymer membrane coated with a metal to act as a surface electrode. The base polymer may be perfluorinated alkenes with short side-chains of ionic groups or styrene/divinylbenzene based with substituted ionic groups. Perfluorinated alkenes have large polymer backbones and the side chains provide the ionic groups that interact with a solvent to produce active characteristics. Styrene polymers take ionic groups from the phenyl rings to produce active mechanism.

In an example embodiment, a base for the IMPCs is Nafion R 117 (DuPont®), which is a perfluorosulfonic acid polymer. In other examples the base may be Flemion, or other polystyrene polymers. Nafion is slender, flexible, rugged and can sustain large strains making the material useful for high stress environments. The ability to endure large strains also allows Nafion to have a large stroke that may be useful since operating frequencies are estimated to be between about 0.2 and about 4.2 Hz, for example. In example embodiments below, Nafion IPMC may be used as a sustainable power generating source in different media such as air, deionized water, and ionic fluids, for example.

In further example embodiments, use of Silver (Ag) nanoparticles sputtered on surfaces of the Nafion membrane may enhance power output in some examples. Thus, silver nanoparticle functionalized Ionic Polymer-Metal composite (IPMC) can be used to convert mechanical vibrations and fluidic flow to useful electrical energy of a level sufficient to power wireless devices and microelectronic and microelectromechanical systems (MEMS), for example. Embodiments described herein may be used to power biological implants using electrical power harvested from blood flow, powering wireless sensors, and wearable devices, for example.

Thus, an IPMC including a thin polyelectrolyte membrane of EAP (e.g., such as Nafion) can be plated on both faces by a noble metal, such as platinum (Pt) or silver (Ag), and may be neutralized with an amount of counter ions to balance a charge of anions covalently bonded to the EAP membrane. In ionic polymers, for example, electromechanical coupling is ionic diffusion, which includes motion of mobile cations. Ionic polymers have both fixed anions and mobile cations. When the material is hydrated, the cations diffuse toward an electrode on a surface of the material under an applied electric field. Inside the polymer structure, anions in interconnected clusters provide channels for the cations to flow toward the electrode. This motion of ions causes the polymer structure to bend toward the anode. Bending the ionic polymers will also force ion diffusion and produce voltage, which can be measured or collected through electrodes. When the IPMC is subjected to an oscillatory bending motion, an electric potential is developed. Energy may be harvested from these motions using capacitors and AC/DC converters to produce sustainable power, for example.

FIG. 1A illustrates a side view of an energy harvesting element 100 including a polymer 102 coated with an electrode 104 and 106 on either side of the polymer 102. The polymer 102 may be a rectangular shape and include the electrode 104 and 106 coating on opposing sides of a length of the polymer 102. The polymer 102 may be a polystyrene backbone membrane, such as Nafion or Flemion, for example. The electrodes 104 and 106 may be noble metals, such as platinum, gold, or silver, for example.

Using a dispersion technique to coat the polymer 102 also allows the electrodes 104 and 106 to cover a large surface area of the polymer 102. Furthermore, using silver as the electrodes 104 and 106 may lead to better oxidation of counter-ions in an electrolyte. For example, silver atoms have filled d-orbitals with energy below Fermi energy leading to good oxidation of counter-ions in the electrolyte. In addition, silver may provide enhanced hydration of the membrane due to the polystyrene backbone of Ag coating and random spaces. Other materials may be used to coat the membrane as well. For example, another coating material, platinum (Pt), has incompletely filled d-orbital and an energy exceeding the Fermi energy level, which may lead to relatively less oxidation and hence less possible energy to harvest. As a further example, a combination of platinum and silver may be used as the electrode coating.

In addition, due to a polystyrene backbone membrane and the silver coating there may be enhanced hydration of the polymer 102. Therefore, presence of water increasingly enables the silver-electrodes 104 and 106 to harvest more energy. The random backbone networks of the polymer 102 on which the silver nanoparticles are dispersed also enhance hydration of the polymer 102 (e.g., Nafion membrane) underneath.

In FIG. 1A, two elongated surfaces of the polymer 102 are shown to be entirely coated with the electrode 104 and 106. However, in other embodiments, only a portion of surfaces of the polymer 102 may be coated, or only one surface or a portion of one surface may be coated with an electrode coating. Placement of the coating and an amount of the coating may vary depending on an application of the energy harvesting element.

In one example, the electrode coating 104 and 106 may be deposited in channels of the polymer 102. For example, channels less than about one centimeter wide may be present lengthwise along the polymer 102 from one end to the other end, and may be about 2-3 cm long. The silver electrodes 104 and 106 may be deposited in the channels to form a substantially uniform coating on a surface of the polymer 102. Due to the individual channels, the coating of the electrode may include texture. The electrode coating 104 and 106 may be of a thickness of about 0.1 cm (or less than about 10 microns), for example.

A flow of charge in the energy harvesting element 100 may be from the electrode 104 to the electrode 106, or from the electrode 106 to the electrode 104. A continuous flow of charge can be achieved with a substantially uniform silver electrode coating, for example, when the energy harvesting element 100 is subjected to an actuation environment, such as within a flow of sea water.

In addition, the electrode coating 104 and 106 may be spaced away from edges of the polymer 102 edges by about 1-4 mm, for example. During deposition of the electrode, a mask may be placed on the polymer 102 over the edges, and the mask can be removed after application of the electrode. Sides of the polymer 102 may not include any electrode coating, for example.

A connection to the electrodes 104 and 106 may be made at any location on the polymer to connect the energy harvesting element 100 to a circuit. For example, a connection may be made from a top of the polymer 102, and the connection may include a thin metal weld connection diffused to the polymer 102, for example.

Figure 1B:
FIG. 1B illustrates a side view of another example of an energy harvesting element.

FIG. 1B illustrates another embodiment of an energy harvesting element 108 including a polymer 110 in which only one side of the polymer 110 includes an electrode coating 112. The other side of the polymer 110 includes a graphitic or carbon coating 114, for example. The energy harvesting element 108 may be used as a fuel cell, for example. The energy harvesting element 108 may be a hybrid type device. In such a hybrid device, the polymer 110 can undergo bending. On an anode or metal based electrode (e.g., electrode coating 112) of the energy harvesting device 108, porous channels will allow hydrogen to flow inside the perfluorinated membrane of the polymer 110. In presence of a second electrode (cathode) (e.g., graphitic or carbon coating 114) on the other/second surface of the polymer 108, oxygenation will be required. At the cathode layer, hydrogen ions coming through the perfluorinated backbone of the polymer 108 will react with oxygen. As a result, current will flow in an outer circuit between the cathode to anode and water will be produced due to the hydrolysis type reaction. Such a hybrid device with two outer electrodes 112 and 114 along with a deformable perfluorinated membrane 110 will produce a current that is a combination of hydrogen ion migration and resulting proton exchange via hydrolysis, in addition to the bending deformation induced charge previously explained.

Figure 1C:
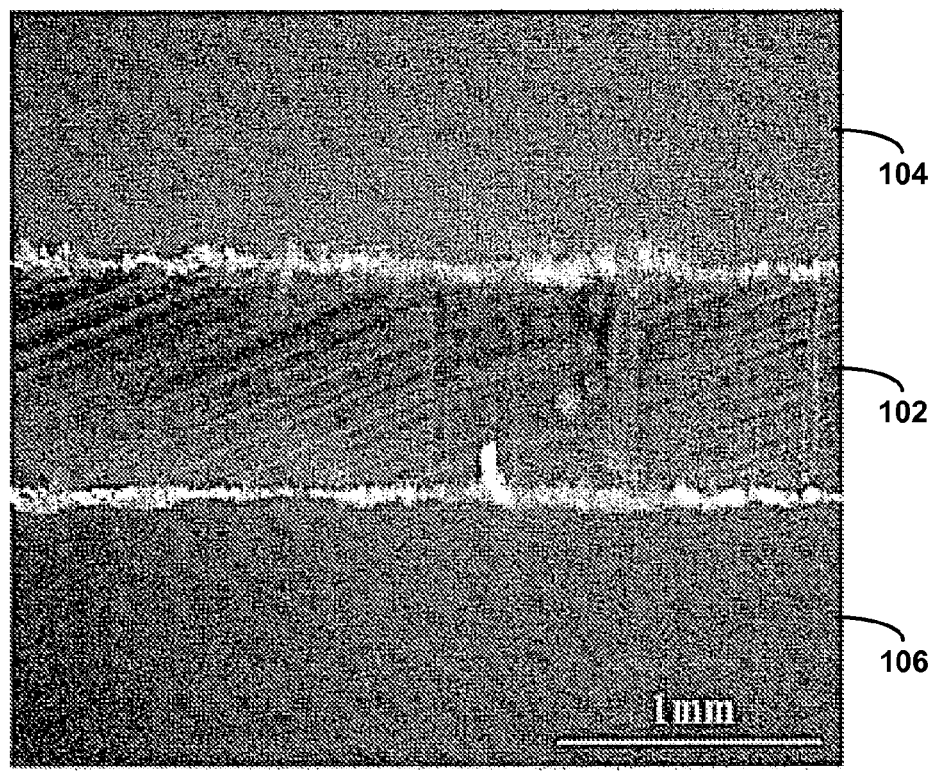
FIG. 1C is an optical micrograph of a cross-section of an example energy harvesting element including a silver-coated Nafion membrane.
Figure 2A:
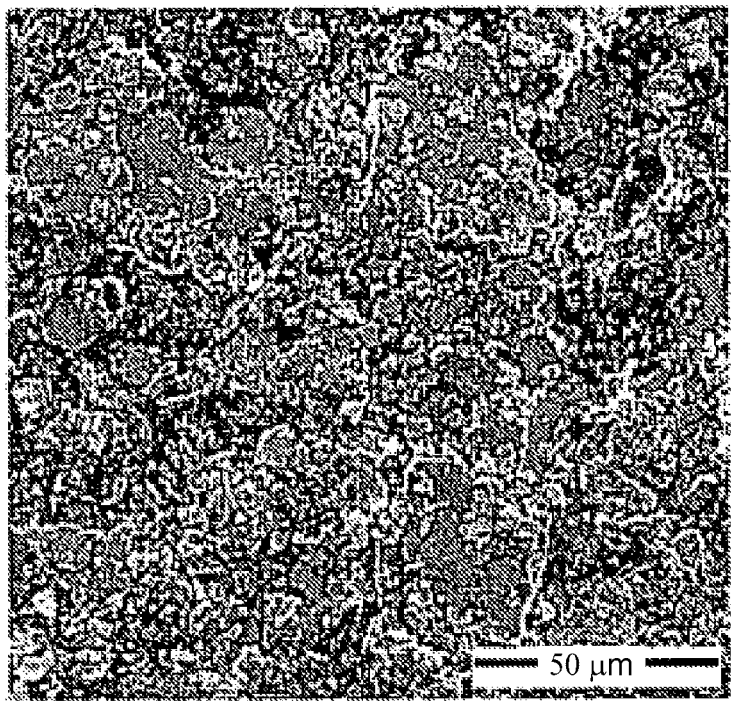
FIGS. 2A and 2B are scanning electron micrographs (SEM) of an example energy harvesting element.
Figure 2B:
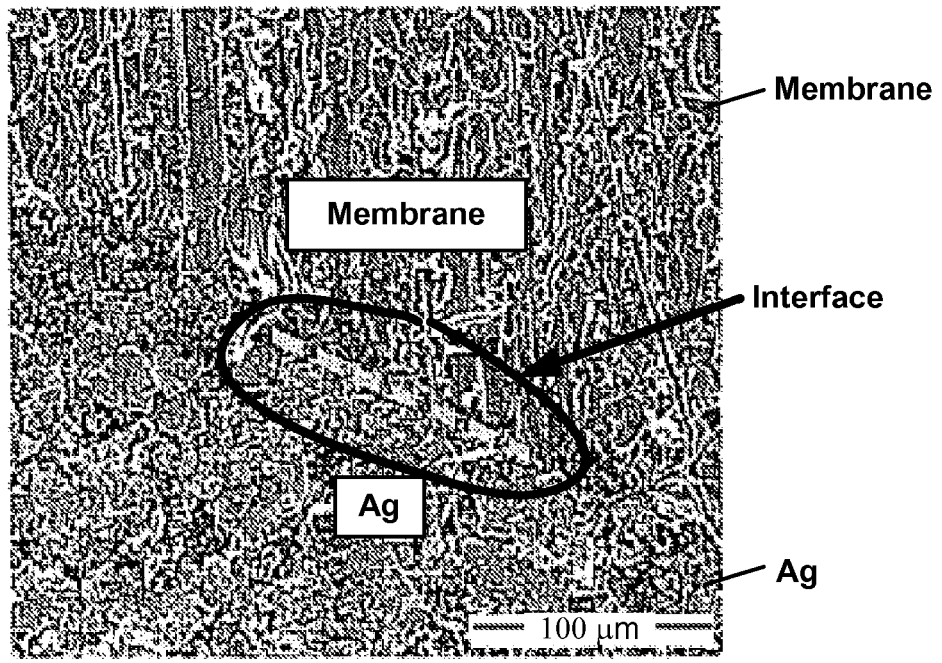

FIG. 1C is an example optical micrograph of a cross-section of the energy harvesting element 100 including an Ag-coated Nafion membrane. The polymer 102 is shown with a uniform coating of silver electrodes 104 and 106 on both sides of the polymer 102. FIGS. 2A and 2B are example scanning electron micrographs (SEM) of the energy harvesting element 100 of FIG. 1A that illustrate surface morphology of the element at an interface of the Ag based electrode and the base polymer membrane of Nafion, for example. For example, FIG. 2A illustrates islands of Ag deposition upon the polymer membrane 102, and FIG. 2B illustrates the interface between the Ag electrode region and the bare polymer membrane 102.

The Ag coating may act as an electrode on the IPMC. The Ag electrode coating appears homogeneous and may develop micro-cracks within a first few cycles of deformation and islands of metal nanoparticles via migration, which then become stabilized. When the membrane is subjected to cyclic mechanical deformation, the interconnected islands of metal nanoparticles facilitate charge transport followed by saturation of the transport current intensity through electrical networks.

In example embodiments, bending of an IPMC creates a potential difference between electrodes of the IPMC. Electrostatic interaction between two neighboring polymeric chains is considered and electrostatic repulsion between asymmetrically distributed (about the middle plane) charges along different cross sections may lead to bending. A constitutive model expressing electromechanical behavior of an IPMC can be expressed as:

$$\sigma_{xx} = c\varepsilon_{xx} + g\left(\varepsilon_{xx}, \frac{\partial \omega}{\partial x}, \rho_c\right) \quad \text{Equation (1)}$$

where $$g\left(\varepsilon_{xx}, \frac{\partial \omega}{\partial x}, \rho_c\right)$$

is the eigenstress developed and an explicit form is derived by considering electrostatic interactions between polymer chains.

A charge distribution along a cross-section of the IPMC is derived due to applied potential. A small boundary layer of accumulated positive ions may develop, which is a function of the applied voltage. Ionic flux due to motion of the charge across the cross-section is proportional to a charge density gradient, electric potential gradient, pressure gradient, and velocity of water molecules. The ionic flux is given by:

$$J^+ = -D^+\left(\frac{\partial C^+}{\partial z} + \frac{C^+ F}{RT}\frac{\partial \varphi}{\partial z} + \frac{C^+ V^{+\omega}}{RT}\frac{\partial p}{\partial z}\right) + C^+ v \quad \text{Equation (2)}$$

where $J^+$, $D^+$, $C^+$, $\phi$, T, R, v, p, $V^{+\omega}$ and z are the ionic flux, ionic diffusivity coefficient, positive ion charge density, electric potential, temperature, gas constant, velocity of water molecules, pressure, molar volume, and thickness coordinate along the cross-section, respectively. The ionic flux due to pressure gradient and flow of water molecules is considered negligible. Hence, only the first two terms of Equation (2) are considered.

Figure 3:
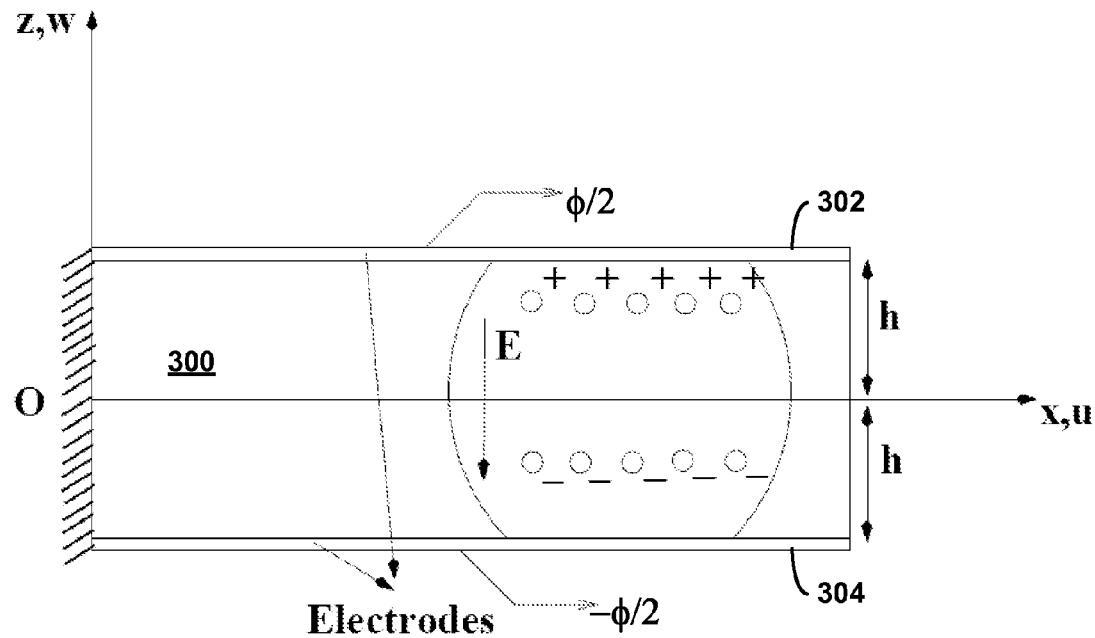
FIG. 3 is a schematic of an example IPMC beam with electrodes.

An example schematic of an IPMC beam 300 with electrodes 302 and 304 is shown in FIG. 3. In FIG. 3, charges are shown to transfer between the electrodes 302 and 304 through the IPMC 300. Variation in potential is determined by using electrostatic equations given as:

$$\frac{\partial D}{\partial z} = (C^+ - C^-)F, \; D = \kappa E, \; E = -\frac{\partial \varphi}{dz} \quad \text{Equation (3)}$$

where D, E, κ are the electric displacement, electric field and electric permittivity, respectively. The continuity equation relating the ionic flux to charge density is given by:

$$\frac{\partial C^+}{\partial t} + \frac{\partial J^+}{\partial z} = 0 \quad \text{Equation (4)}$$

Substituting of Equations (2) and (3) into Equation (4) provides:

$$\frac{\partial}{\partial z}\left\{\frac{\partial(\kappa E)}{\partial t} - D^+\left[\frac{\partial^2(\kappa E)}{\partial z^2} - \frac{C^- F^2}{\kappa RT}(\kappa E)\right]\right\} = 0 \quad \text{Equation (5)}$$

Equation (5) provides for a natural length scale l and a time scale τ which characterizes a length of boundary layers and a relative speed of cation redistribution. These two scales are given by:

$$l = \left(\frac{\bar{\kappa}RT}{C^-F^2}\right)^{1/2}, \tau = \frac{l^2}{D^+} \quad \text{Equation (6)}$$

where $\bar{\kappa}$ is an average electric permittivity of the of the IPMC beam. A time-independent equilibrium ion distribution is given by setting the ionic flux as zero. Upon application of a potential, there is an asymmetric distribution of charge with respect to a middle plane of the beam. This results in development of a cation depleted boundary layer. Charge density in the cation depleted layer is constant and is given by $(-C^-F)$, and in the remaining membrane, the charge density is $(C^+-C^-)F$. A thickness of the boundary layer is taken to be l'. An electric field $E(z)$ in a region $-h \leq z \leq (-h+l')$ is obtained by solving:

$$\frac{\partial (\bar{\kappa}E)}{\partial z} = -C^-F$$

which gives:

$$E^{(1)}(z) = -\frac{C^-Fz + \bar{E}_0}{\bar{\kappa}} = \frac{1}{l}\left(-K_0\frac{z}{l} + E_0\right) \quad \text{Equation (7)}$$

where:

$$K_0 = \frac{C^-Fl^2}{\bar{\kappa}} = \frac{RT}{F} \quad \text{Equation (8)}$$

Solving for potential $\varphi$ using Equation (3) gives:

$$E = -\frac{\partial \varphi}{\partial z}, \quad \text{Equation (9)}$$

$$\varphi^{(1)}(z) = \frac{K_0}{2}\left(\frac{z}{l}\right)^2 - E_0\frac{z}{l} + A_0$$

In a remaining part of the membrane $-h+l' \leq z \leq h$, solution of a time independent part of Equation (5) is given by:

$$\frac{\partial^2 E}{\partial z^2} - \frac{1}{l^2}E = 0 \quad \text{Equation (10)}$$

Solution of Equation (10) is of the form:

$$E^{(2)}(z) = \frac{1}{l}\left[B_0\exp\left(\frac{z}{l}\right) + B_1\exp\left(-\frac{z}{l}\right)\right]$$

and solving for potential $\varphi$ using Equation (3) gives:

$$E = -\frac{\partial \varphi}{\partial z}, \quad \text{Equation (11)}$$

$$\varphi^{(2)}(z) = -B_0\exp\left(\frac{z}{l}\right) + B_1\exp\left(-\frac{z}{l}\right) + B_2$$

and the charge density is given by:

$$\rho_c = (C^+(z) - C^-)F \quad \text{Equation (12)}$$

$$= \frac{C^-F^2}{RT}\left[B_0\exp\left(\frac{z}{l}\right) - B_1\exp\left(-\frac{z}{l}\right)\right]$$

The terms $\bar{E}_0$, $A_0$, $l'$, $B_0$, $B_1$, $B_2$ are integration constants which are calculated from boundary conditions, continuity conditions, and overall charge balance conditions. The continuity conditions at the boundary layer interface $z=-h+l'$ are as follows:

$$C^+(-h')=0 \text{ where } h'=h-l',$$

$$E^{(1)}(-h')=E^{(2)}(-h')$$

$$\varphi^{(1)}(-h')=\varphi^{(2)}(-h') \quad \text{Equation (13)}$$

The end boundary conditions are:

$$\varphi^{(1)}(-h') = \frac{\phi_0}{2}$$

$$\varphi^{(2)}(h') = -\frac{\phi_0}{2}$$

as shown in FIG. 3. The overall charge balance along the cross-section is given by:

$$\int_{-h}^{h}(C^+ - C^-)dz = 0 \quad \text{Equation (14)}$$

Solving for the integration constants $\bar{E}_0$, $A_0$, $l'$, $B_0$, $B_1$, $B_2$ under the assumption that $[a=h/l \gg 1]$ and $[a'=h'/l \gg 1]$ provides the constants as:

$$E_0 = K_0(1 - a') \quad \text{Equation (15)}$$

$$A_0 = \frac{\phi_0}{2} - K_0\left(1 + \frac{l'}{l} - 2a\right)$$

$$B_1 = K_0\exp(-a')$$

$$\frac{l'}{l} = \sqrt{\frac{2\phi_0 F}{RT}} - 2$$

$$B_2 = \frac{\phi_0}{2} - \frac{1}{2}K_0\left[\left(\frac{l'}{l} + 1\right)^2 + 1\right]$$

$$B_0 = \exp(-a)\left[\frac{\phi_0}{2} + B_1\exp(-a) + B_2\right]$$

Figure 4:
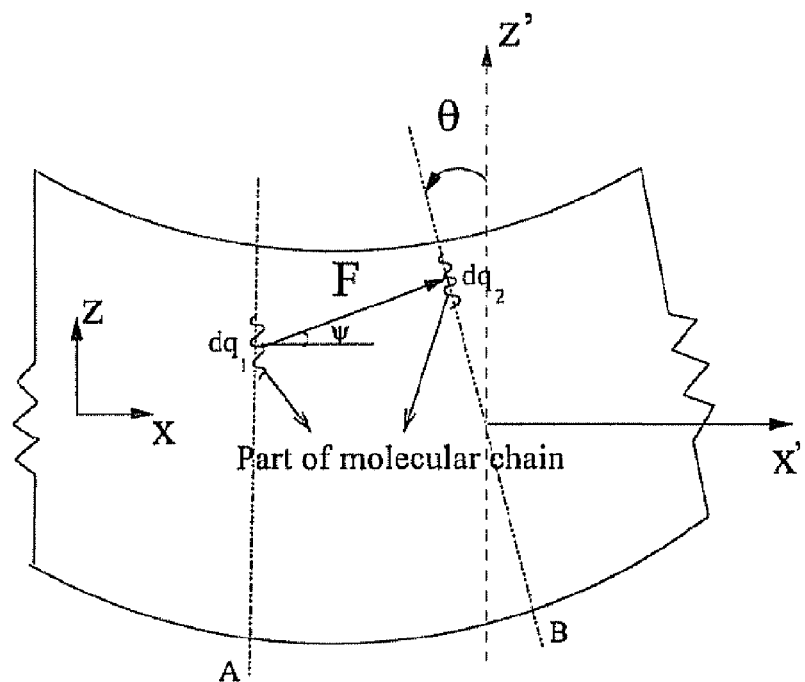
FIG. 4 is a schematic representation illustrating example molecular chains and electrostatic forces along two neighboring cross-sections of a portion of an IPMC membrane.

Eigen stress that develops is computed considering electrostatic repulsion between the asymmetrically distributed charges along different cross-sections. This repulsion leads to bending. FIG. 4 is an example schematic representation illustrating molecular chains and electrostatic forces along two neighboring cross-sections of a portion of an IPMC membrane. Using FIG. 4, the force of repulsion due to a charge distribution on one cross-section on the charge distribution across another cross section can be obtained as:

$$F_x = \int\int \frac{dq_1 dq_2}{4\pi\kappa[(x+z'\theta)^2 + (z'-z)^2]} \quad \text{Equation (16)}$$

Since $dq = \rho_c b dz$, then the stress can be written as:

$$\sigma_{xx}^e(z) = \rho_c(z) \int_0^L \int_{-h}^{h} \frac{b\rho_c(z')\cos\psi dz' dx}{4\pi\kappa[(x+z'\theta)^2 + (z'-z)^2]} \quad \text{Equation (17)}$$

where b is the breadth of the IPMC strip, z is co-ordinate along the thickness direction, x is co-ordinate along the length direction, κ is an overall permittivity of IPMC and ρc(z') is a charge density obtained from Equation 12. From FIG. 4, the following Equation is determined:

$$\cos\psi = \frac{x + z'\theta}{\sqrt{(x+z'\theta)^2 + (z'-z)^2}} \quad \text{Equation (18)}$$

Substituting Equation (18) into Equation (17) provides:

$$\sigma_{xx}^e(z) = \rho_c(z) \int_0^L \int_{-h}^{h} \frac{b\rho_c(z')(x+z'\theta) dz' dx}{4\pi\kappa[(x+z'\theta)^2 + (z'-z)^2]^{\frac{3}{2}}} \quad \text{Equation (19)}$$

Thus, the relationship between eigen stress and $\sigma_{xx}^e$ is:

$$g\left(\varepsilon_{xx}, \frac{\partial \omega}{\partial x}, \rho_c\right) = \sigma_{xx}^e(z) \quad \text{Equation (20)}$$

Kinematics of a beam undergoing a large deformation can also be derived. The eigen stress along with the constitutive model is used to derive governing differential equations of the IPMC. Using an example IPMC beam with electrodes as shown in FIG. 3, let u, v, w be displacements in the x, y, z directions, respectively. Considering unidirectional bending about the y-axis, $u=u(x)$, $w=w(x)$ and $v=0$. A deformation gradient can be approximated as:

$$F = \begin{bmatrix} 1+\frac{\partial u}{\partial x} & \frac{\partial u}{\partial y} & \frac{\partial u}{\partial z} \\ \frac{\partial v}{\partial x} & 1+\frac{\partial v}{\partial y} & \frac{\partial v}{\partial z} \\ \frac{\partial \omega}{\partial x} & \frac{\partial \omega}{\partial y} & 1+\frac{\partial \omega}{\partial z} \end{bmatrix} = \begin{bmatrix} 1+\frac{\partial u}{\partial x} & 0 & -\theta \\ 0 & 1 & 0 \\ \frac{\partial \omega}{\partial x} & 0 & 1 \end{bmatrix}$$

where θ is the angle of rotation or euler angle of the beam.

Figure 5:
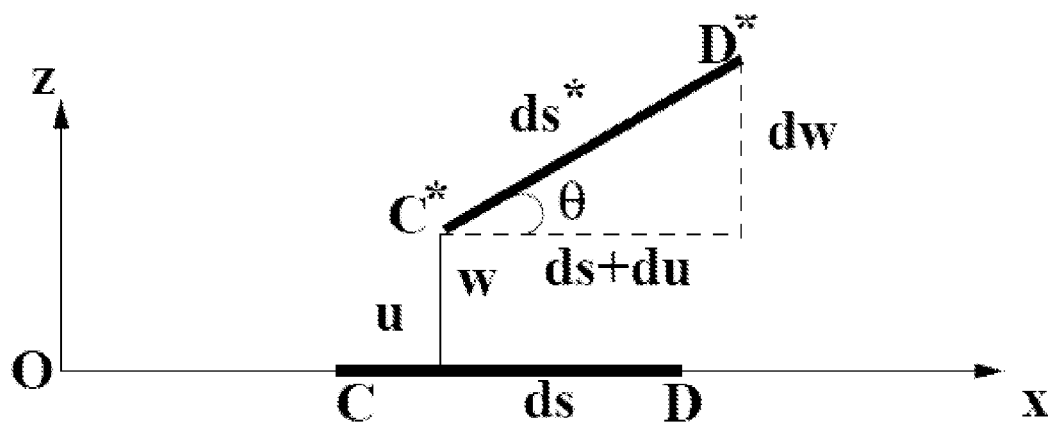
FIG. 5 is an example plot that illustrates deformation of a beam element along a neutral axis.

FIG. 5 is an example plot that illustrates deformation of a beam element along a neutral axis. For example, consider deformation of the element CD, which is of length ds located at a distance s from the origin O of the (x, z) system as shown in FIG. 5. Upon deformation, CD moves to C*D*. The displacement components of C and D are denoted by (u,w) and (u+du, w+dw), respectively. From FIG. 5, the strain e at point C can be calculated as:

$$e = \frac{ds^* - ds}{ds} = \sqrt{\left(1+\frac{\partial u}{\partial x}\right)^2 + \left(\frac{\partial \omega}{\partial x}\right)^2} - 1 \quad \text{Equation (21)}$$

With an assumption of inextensible neutral plane, e=0 thereby implying:

$$\left(1+\frac{\partial u}{\partial x}\right)^2 + \left(\frac{\partial \omega}{\partial x}\right)^2 = 1 \quad \text{Equation (22)}$$

The Euler angle θ is related to u and w as:

$$\tan\theta = \frac{\frac{\partial \omega}{\partial x}}{1+\frac{\partial u}{\partial x}}$$

$$= \frac{\frac{\partial \omega}{\partial x}}{\sqrt{1-\left(\frac{\partial \omega}{\partial x}\right)^2}} \quad \text{Equation (23)}$$

The longitudinal strain is given by the relation:

$$\varepsilon_{xx} = -z\frac{\partial \theta}{\partial x} \quad \text{Equation (24)}$$

$$= -z\frac{\partial}{\partial x}\left[\tan^{-1}\left(\frac{\frac{\partial \omega}{\partial x}}{\left(1+\frac{\partial u}{\partial x}\right)}\right)\right]$$

$$= -z\frac{\partial}{\partial x}\left[\tan^{-1}\left(\frac{\frac{\partial \omega}{\partial x}}{\sqrt{1-\left(\frac{\partial \omega}{\partial x}\right)^2}}\right)\right]$$

The momentum conservation equation of the polymer beam is given by $$\nabla \cdot \sigma = \nabla \cdot \left(c\varepsilon_{xx} + g\left(\varepsilon_{xx}, \frac{\partial \omega}{\partial x}, \rho_c\right)\right) = 0 \quad \text{Equation (25)}$$

Equation (25) can be solved with displacement and stress boundary conditions. Because of low stiffness and high power to weight ratios, IPMCs can be exploited to harness natural energy sources.

Experiments were performed to determine an influence of various different media and an amount of hydration on the IPMC's energy harvesting performance. Results described below demonstrate that there is an increase in energy density generated due to bending load in presence of liquid media such as de-ionized water and ionic fluids (salt electrolytes), for example.

Figure 6:
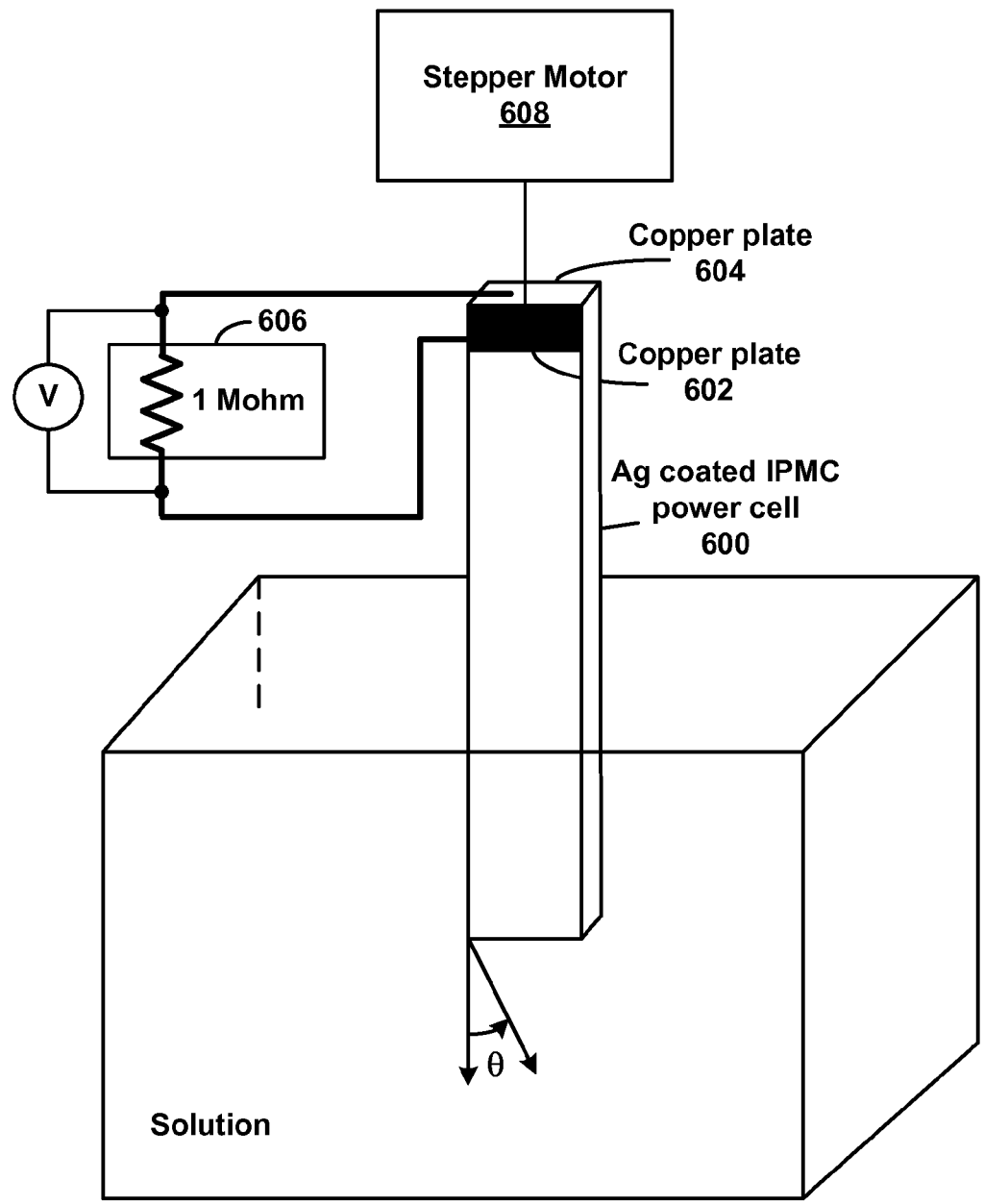
FIG. 6 illustrates an example configuration of an IPMC power cell.

FIG. 6 illustrates an example configuration of an IPMC power cell 600. The IPMC power cell 600 may be a silver nanoparticle coated IPMC power cell. The silver nanoparticle based electrode layer on the IPMC film surfaces act as electrodes as well as efficient charge carriers. The IPMC power cell 600 may be prepared by preparing a surface of an IPMC strip using ultrasonication followed by electro-chemical etching under elevated temperature. Silver nanoparticle based binding layers are then made on surfaces of the IPMC strip using a sol-gel process. The IPMC power cell 600 includes two copper plates 602 and 604 as end clamps acting as leads on opposing sides of the IPMC power cell 600 at one end. Two electrically insulating poly-propylene strips (not shown) can be used to grip the copper plates 602 and 604. The pair of copper plates 602 and 604 perform as the electrical interconnects.

The IPMC power cell 600 may be a strip of IPMC (Nafion) membrane of dimensions of about 0.4 cm× about 0.2 cm× about 0.1 mm. As another example, the IPMC power cell 600 may include dimensions of about 5.2 cm×about 2 cm×about 0.1 cm. The IPMC power cell 600 may be of other lengths, widths, and heights, or be in ranges of between about 0.4 cm-5.2 cm× about 0.2 cm-2 cm× about 0.1 mm-0.1 cm, for example. The IPMC power cell 600 may weigh about 0.3 g. In example embodiments, the IPMC power cell 600 may be any electroactive polymer, ionic polymer, or piezoelectric polymer composites, and includes an electrode coating, such as a silver electrode coating.

A load 606, such as a resistive load of 1 MOhms, can be connected in series with the IPMC power cell 600 to utilize energy generated by the IPMC power cell 600. The example value of electrical resistance is chosen as this is comparable to internal impedance of the IPMC strip, for example. To simulate movement of the IPMC power cell 600, the IPMC power cell 600 is connected to a stepper motor 608 (e.g., via an aluminum extension not shown). The stepper motor 608 can be driven using a BJT current amplifier, for example. A control input to the stepper motor 600 can be triggered via a micro-controller that instructs the stepper motor 608 to rotate in a clockwise direction for a given time interval and to rotate in an anticlockwise direction for the same time interval. This movement establishes an oscillatory or flapping type motion of the IPMC power cell 600. Variation in amplitude and frequency of oscillations is obtained by modifying movement of the stepper motor 608. A frequency is changed by varying internal delay between each step of the stepper motor 608. An oscillation amplitude is modified by varying a duty cycle of rotational motion in each direction. The oscillations of the stepper motor 608 are adjusted so that the motion is approximately centered to a vertical plane and so that there are equal deflections in both directions.

The IPMC power cell 600 is placed within a solution (e.g., a salt electrolyte solution of various concentrations or de-ionized water) and the motion of the stepper motor 608 is applied. A maximum deflection of the stepper motor 306 maintains the IPMC power cell 600 immersed in the solution. After connecting leads to the resistive load, a voltage across the resistive load is measured. Electromagnetic shielding can be used to reduce or eliminate noise in the measured voltage. In FIG. 6, θ is a maximum angular displacement of the IPMC power cell 600 from a mean position.

The Ag-coated IPMC power cell 600 in this example has a surface area of about 10.4 cm² (5.2 cm×2 cm). Experiments were performed in air, deionized water, and sodium chloride (NaCl) electrolyte with NaCl concentrations of about 5 g/l, about 19 g/l, and about 35 g/l. For example, the highest concentration of 35 g/l chosen substantially corresponds to salt concentration in sea water.

The IPMC power cell 600 generates energy due to a motion of charges between the silver electrode coatings through the Nafion polymer, for example. The motion of charges can be increased by hydrating the IPMC power cell 600. The motion of charges leads to a current and a potential difference between the two sides (e.g., electrodes) of the IPMC power cell 600. Once energy is created, any type of circuit may be connected to the IPMC power cell 600 to utilize the energy, such as the load 606 illustrated in FIG. 6. Alternatively, capacitors may be connected to the IPMC power cell 600 to store the charge that is generated, for example.

Figure 7:
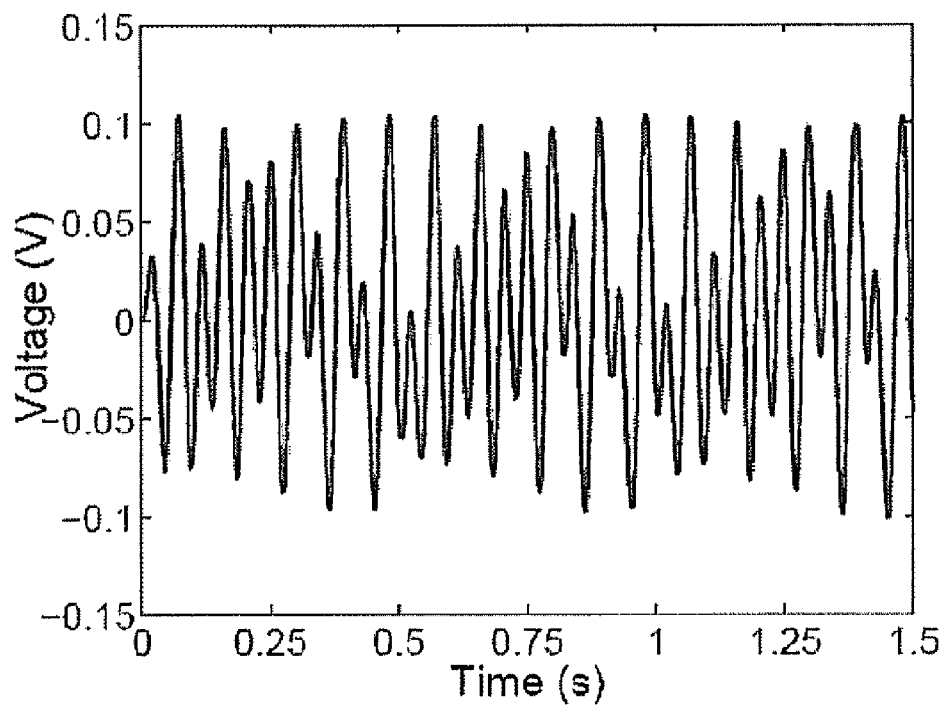
FIG. 7 shows an example plot of a voltage time history of the IPMC power cell of FIG. 6.

FIG. 7 shows an example plot of a voltage time history of the IPMC power cell 600 over a time interval of 1.5 seconds at a frequency of about 10.2375 Hz. The plot indicates the mechanical behavior of the IPMC power cell 600 and the fluid structure interaction at a particular frequency. From FIG. 7, it can be noted that an output wave has a double sinusoidal characteristic, which implies induced secondary harmonics in the IPMC power cell 600 possibly due to stepper motor loading and the fluid structure interaction, for example. Thus, voltage generated by the IPMC power cell 600 may be in a range of hundreds of mV for a 1 Mohm resistive load, which can be significant in context of powering wireless communication devices, for example.

Figure 8:
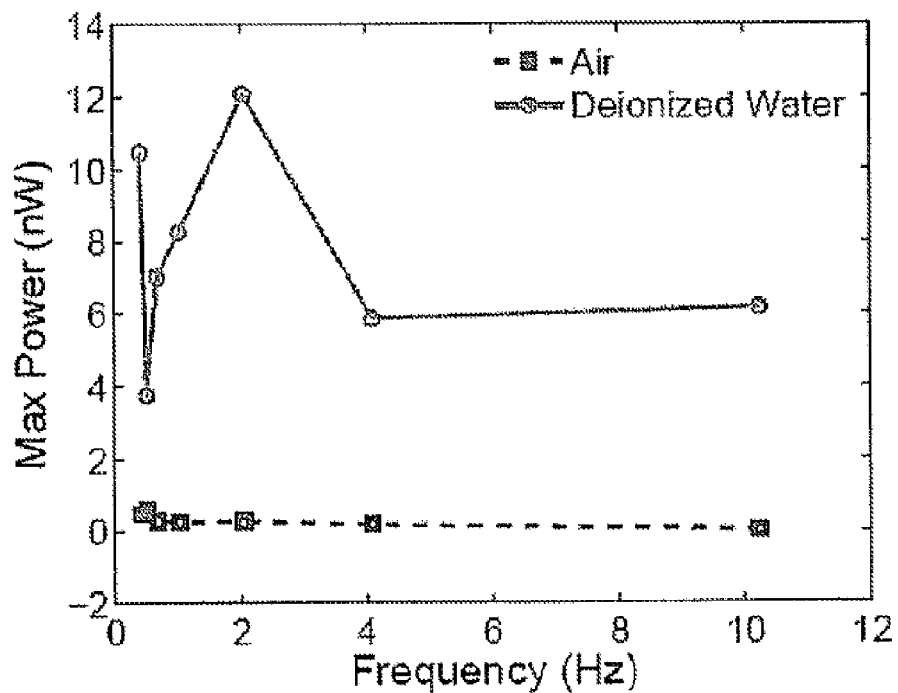
FIG. 8 is an example plot that illustrates a comparison of a maximum root mean square (RMS) power output measured across a load of the configuration in FIG. 6.

FIG. 8 is an example plot that illustrates a comparison of a maximum root mean square (RMS) power output measured across the 1 Mohm resistor in air and in deionized water. FIG. 8 illustrates that the IPMC power cell 600 in a hydrated state generates higher power at low frequencies and a maximum power $P_{max}$ generated in deionized water is an order of magnitude higher than $P_{max}$ generated in air. FIG. 8 illustrates that in air $P_{max}$ remains constant at higher frequencies, for example. The IPMC power cell 600 may provide such output power levels due to increased concentration of water molecules in the diffused Ag-electrode-Nafion interface, for example, which contributes to an increase in charge carriers (e.g., protons). The plot of FIG. 8 illustrates a peak at about 2 Hz, which is due to resonance of the IPMC power cell 600 in water. However, the IPMC power cell 600 may be operated at frequencies of about 0.2 Hz to about 4.2 Hz to obtain a high power output. This frequency range may be optimum for the chosen size of the membrane in this experiment (e.g., about 0.4 cm× about 0.2 cm× about 0.1 mm). Thus, this frequency range can be scaled by scaling the geometry and size of the membrane.

Figure 9:
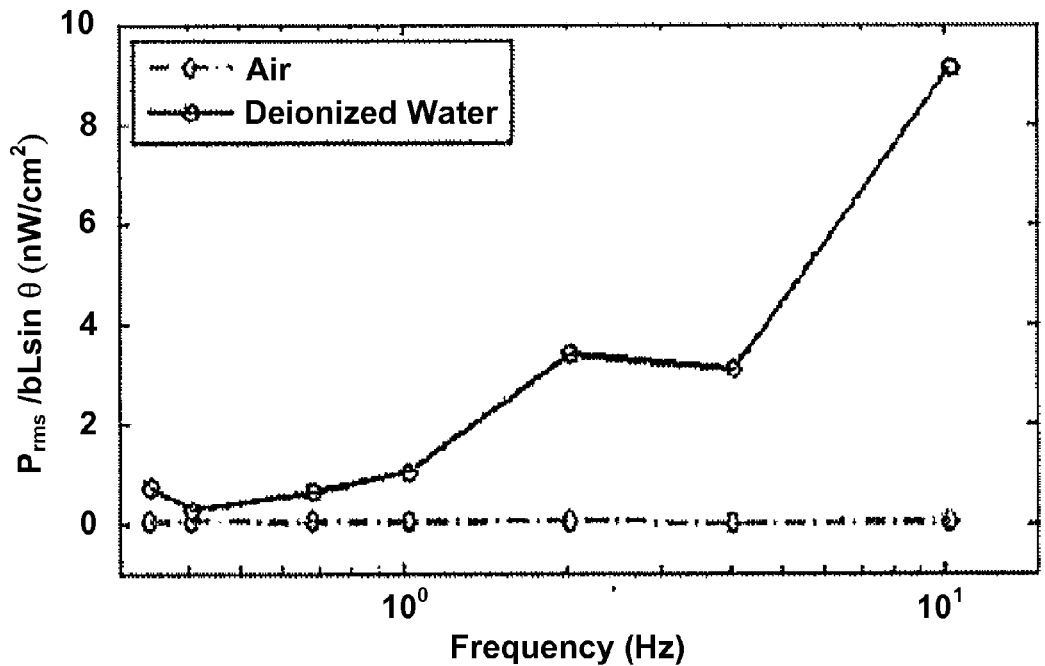
FIG. 9 is an example plot that illustrates RMS power ($P_{rms}$) output measured across the resistor load of the configuration in FIG. 6.

FIG. 9 is an example plot that illustrates RMS power ($P_{rms}$) output measured across the resistor load normalized with respect to an approximate measure of peak deflection bLsinθ against frequency, where L is a length and b is a width of IPMC power cell 600, and θ denotes a maximum angular displacement of a root of the IPMC power cell 600 from a mean position. The normalized quantity gives an approximate estimate of power generated per unit deformation induced mechanically. A peak normalized $P_{rms}$ for the IPMC power cell 600 in air is about 0.1 nW/cm², while in deionized water the peak normalized $P_{rms}$ reaches a value of about 9.125 nW/cm².

Figure 10:
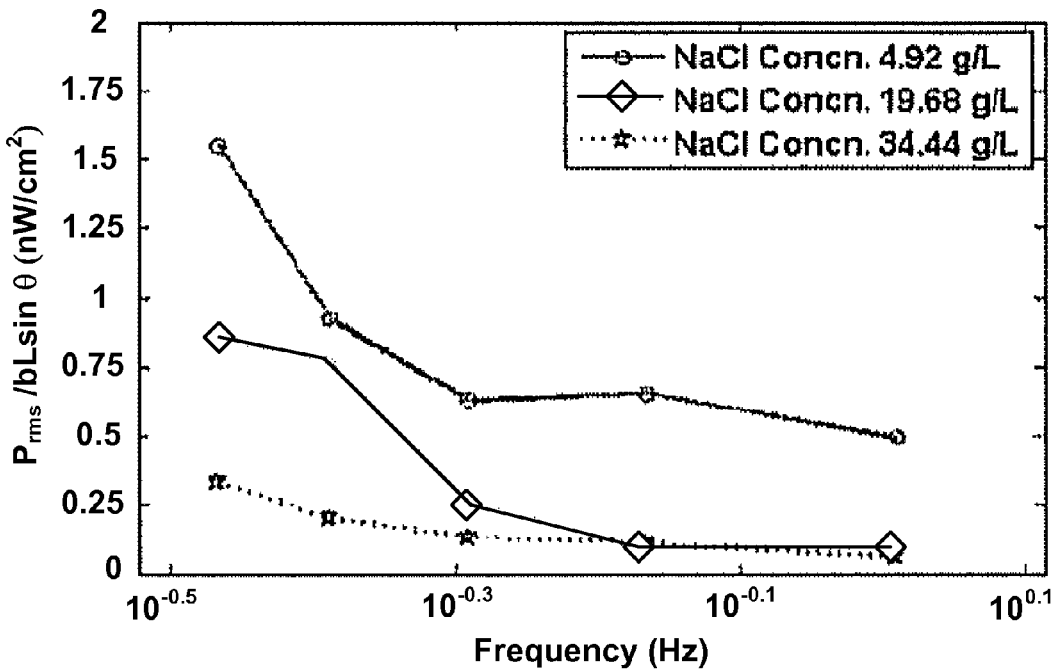
FIG. 10 is an example plot of a comparison of normalized RMS power output measured across the resistor load of the configuration in FIG. 6 for varying salt electrolyte concentrations.

FIG. 10 is an example plot of a comparison of normalized RMS power output measured for varying salt electrolyte concentrations across the 1 Mohm load connected in series with the oscillating IPMC power cell 600. The plot shows a trend of decreasing $P_{rms}$ with increasing frequency for each salt concentration. The plot also illustrates a degradation in performance with an increase in the salt concentration. To some extent, the reduction in $P_{rms}$ may be due to increased localization of sodium (Na) ions around and within the IPMC power cell 600 leading to a mechanical damping and result in reduced bending load.

Figure 11:
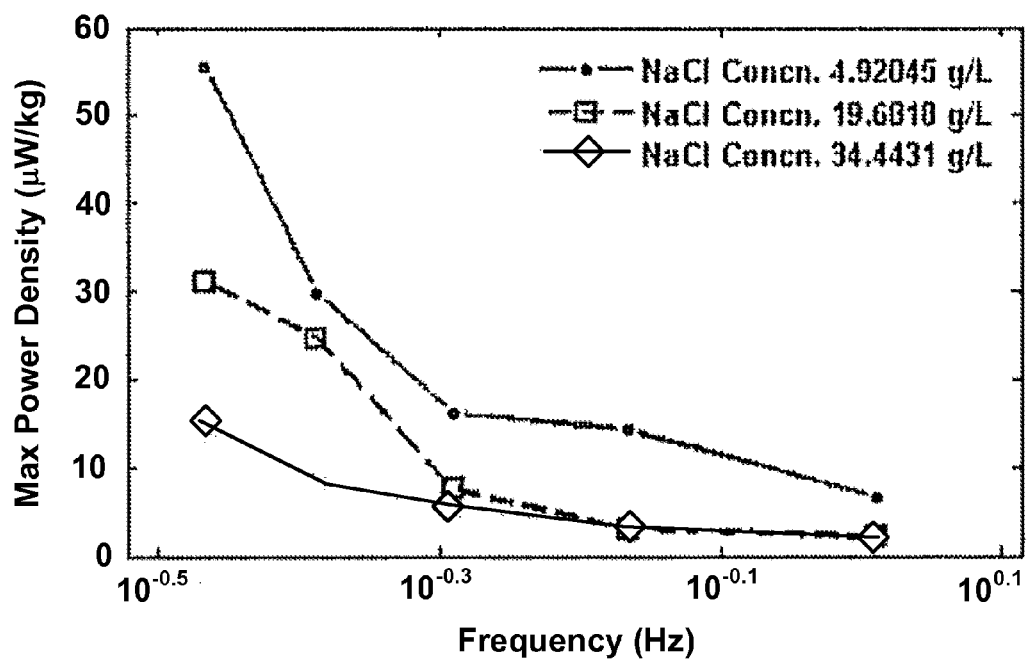
FIG. 11 is an example plot that illustrates a comparison of maximum power density for varying concentrations measured across the resistor load of the configuration in FIG. 6.

FIG. 11 is an example plot that illustrates comparison of maximum power density for varying NaCl concentrations measured across the load of 1MΩ connected in series with the oscillating IPMC power cell 600. The plot shows frequency dependence of $P_{max}$ for various different concentrations of NaCl. An increase in $P_{max}$ indicates that power generation of the IPMC power cell 600 is higher in the presence of liquid electrolyte. At a low frequency of about 0.3412 Hz, a maximum power density of about 52.91 µW/kg is obtained for the 5 g/L NaCl electrolyte, and, for the 20 g/L and 35 g/L NaCl electrolytes, $P_{max}$ is found to be about 29.63 µW/kg and about 12.99 µW/kg, respectively. FIG. 11 also shows that performance of the IPMC power cell 600 decreases with an increase in frequency and with an increase in concentration of the electrolyte. The plot illustrates that $P_{max}$ nearly halves for every 15 g/L increase in concentration of electrolyte. This behavior of a reduction of $P_{max}$ may be due to presence of large sized ions of the NaCl electrolyte. These ions agglomerate around the electrode islands on the Nafion membrane and mechanically dampen the vibrating IPMC power cell 300 resulting in a reduction of $P_{max}$.

In addition, due to increased interaction between counter-ions in the NaCl solutions and the sulfonic groups in Nafion, the power density is better for low concentrations of NaCl and good enough to enhance cation transport. However, as the NaCl concentration increases, a more impermeable interface between the electrolyte and the Nafion polymer membrane forms, which further hinders transport. That is, with the presence of increasing Na ions, the Hydrogen ions in the sulphonic group of Nafion are replaced with Na ions to form cluster of dipoles. A cluster diameter of Na ions (4.21 nm) is less than Hydrogen ions (4.74 nm). A smaller cluster diameter results in a lower stiffness of the material, and leads to a lesser input energy and higher power efficiency. The cluster morphology has an effect on the macroscopic electro-mechanical properties, and also has an effect on ion transport properties of hydrated Nafion. This is evident from FIG. 11 where at an increased concentration of NaCl, the polymer electrolyte interface formed with Na further reduces ionic conductivity of the lamellar structure of Nafion.

Note that when the energy harvesting IPMC power cell is immersed in an electrolyte solution, power output increases as compared to power output in deionized water or air. The copper contacts 602 and 604 of the IPMC power cell 600 do not interact with the electrolytes in any substantial amount, and thus, do not contribute to the power output in any substantial amount. In addition, silver is a noble metal and does not react with the NaCl solution (in any substantial manner), and thus, no red-ox reactions between electrodes and electrolytes occur. The output power is due to the IPMC power cell 600 and motion of the IPMC power cell 600.

In example embodiments, a model is described to determine an induced potential on a surface of an IPMC power cell due to a bending deformation. For example, power conversion efficiency of the IPMC immersed in a fluid can be computed. Linear forced vibration analysis may be performed using fluid loading induced nonlinearity in a forcing term.

Using the configuration in FIG. 6, for example, the power cell 600 is fixed at one end and immersed in a fluid. The power cell 600 is rotated at its root by an angle $\theta(t)$ at a given time t due to which a certain volume of fluid becomes displaced. A dynamic pressure due to the fluid flow acts on the power cell 600 with peak pressure building up at $\theta=0$ (i.e., at about a reference position) where the power cell 600 undergoes maximum bending. In a general case, a total pressure is a summation of static and dynamic pressure, and is given by:

$$p(x', t) = \theta x' b \rho g + \frac{1}{2} C_f \rho b x'^2 \theta^2 \qquad \text{Equation (26)}$$

-continued
$$= \theta_{max} b \rho g \left[ x' \sin(\omega_0 t) - \frac{1}{2} C_f \theta_{max} \omega_0^2 x'^2 \sin^2(\omega_0 t) \right]$$

where $\theta(t) = \theta_{max} \sin(\omega_0 t)$, $\theta_{max}$ is a maximum rotation applied at the root, (x', z') is the coordinate of a point along a rotated reference frame, b is a width of the power cell 600, ρ is a density of a surrounding medium, g is an acceleration due to gravity (relative acceleration is neglected), and $C_f$ is a correction factor (a constant). Considering a time dependent effect in a calculation of dynamic power, and assuming that the effect of inertia is contributing to only kinetic energy and not any strain energy, an equation for elastic deformation of the power cell 600 is given by:

$$EI \frac{\partial^4 w(x', t)}{\partial x'^4} = [\theta_{max} b \rho g \sin(\omega_0 t)] \qquad \text{Equation (27)}$$

$$x' + \left[ -\frac{1}{2} C_f \theta_{max} \omega_0^2 \sin^2(\omega_0 t) \right] x'^2$$

$$\Rightarrow EI \frac{\partial^4 w(x', t)}{\partial x'^4} = f_1(t) x' + f_2(t) x'^2 \approx f_2(t) x'^2,$$

where E is the Young's modulus, I is a second area moment of the power cell 600 cross-section, and w is a transverse displacement of power cell 600. Since at any given point of time, input power depends mainly on a dynamic pressure and a differential static pressure cancels out under fully immersed conditions, the term $f_2(t)x'^2$ is the forcing term. Integrating Equation (27) with respect to x' and by further simplification, the solution of the deflection of the power cell 600 is given by:

$$w(x', t) = \frac{f_2(t)}{EI} \left[ \frac{x'^6}{360} - \frac{L^3}{18} x'^3 + \frac{L^4}{8} x'^2 \right] \qquad \text{Equation (28)}$$

The bending strain in the power cell 600 is given by:

$$\varepsilon_{x'x'} = -z' \frac{\partial^2 w}{\partial x'} \qquad \text{Equation (29)}$$

$$= -z' \frac{f_2(t)}{EI} \left[ \frac{x'^4}{12} - \frac{L^3}{3} x' + \frac{L^4}{4} \right]$$

and bending stress in the power cell 600 can be approximated as:

$$\sigma_{x'x'} = E \varepsilon_{x'x'} + \mu \dot{u} \qquad \text{Equation (30)}$$

where µ is a dynamic viscosity with a corresponding velocity term contributing to skin friction, for example. Corresponding work density can be expressed as:

$$\frac{1}{2} \sigma_{x'x'} \varepsilon_{x'x'} = \frac{1}{2} E \varepsilon_{x'x'}^2 + \mu \dot{u} \varepsilon_{x'x'} \qquad \text{Equation (31)}$$

A total work density at any given point of time t is obtained by integrating over the volume as:

$$U(t) = \int_0^L \int_{-\frac{h}{2}}^{\frac{h}{2}} \int_0^b \left[\frac{1}{2} E \varepsilon_{x'x'}^2 + \mu \dot{u} \varepsilon_{x'x'}\right] dx' dz' dy' \qquad \text{Equation (32)}$$

Upon simplification, Equation (32) becomes:

$$U(t) = \frac{1}{200} \frac{f_2^2(t)}{EI} L^{10} + \frac{\mu}{E} \frac{1}{10} f_2(t) L^5 \qquad \text{Equation (33)}$$

Using the above equations, input power required to deform the power cell 600 is given by:

$$P_{in}(t) = \frac{d}{dt} U(t) \qquad \text{Equation (34)}$$
$$= \left(\frac{L^{10}}{200EI} C_f^2 \theta_{max}^4 \omega_0^5 (b\rho g)^2 \sin^3(\omega_0 t)\cos(\omega_0 t)\right) +$$
$$\left(-\frac{L^5}{10}\frac{\mu}{E} C_f \theta_{max}^2 \omega_0^3 b\rho g \sin(\omega_0 t)\cos(\omega_0 t)\right)$$

Input RMS power can also be computed. For any given rotation applied to the root of the power cell 600, a mechanical input RMS power leading to bending of the power cell 600 also includes power required to overcome skin friction. Hence, rewriting Equation (34) in a two part form—one for elastic part and one for dissipative part of power—gives the following:

$$P_{in}^{RMS} = \sqrt{\frac{1}{2T} \int_0^T [P(t)]^2 dt} \qquad \text{Equation (35)}$$
$$= P_{in\ (elastic)}^{RMS} + P_{in\ (dissipative)}^{RMS}$$

where $$P_{in\ (elastic)}^{RMS} = \sqrt{\frac{\omega_0}{4\pi} \int_0^T \left(\frac{L^{10}}{200EI} C_f^2 \theta_{max}^4 \omega_0^5 (b\rho g)^2 \sin^3(\omega_0 t)\cos(\omega_0 t)\right)^2 dt}$$
$$= \frac{0.1397}{(EI)} \frac{L^{10}}{200} C_f^2 \theta_{max}^4 \omega_0^5 (b\rho g)^2,$$

$$P_{in\ (dissipative)}^{RMS} = \qquad \text{Equation (36)}$$
$$\sqrt{\frac{\omega_0}{4\pi} \int_0^T \left(-\frac{L^5}{10}\frac{\mu}{E} C_f \theta_{max}^2 \omega_0^3 b\rho g \sin(\omega_0 t)\cos(\omega_0 t)\right)^2 dt} = 0$$

While an input RMS power is approximately independent of viscosity (assuming $C_f=1$ for simplicity), the input RMS power is dependent on density of the medium.

Finally, using $P_{in}^{RMS}$ as derived above in Equation (36) and $P_{out}^{RMS}$ obtained from experiments, power efficiency ($P_e$) for corresponding values of peak rotation angle $\theta_{max}$, frequency of rotation $\omega_0$, and fluid density $\rho$ can be computed as:

$$P_e = \frac{P_{out}^{RMS}}{P_{in}^{RMS}} \times 100\% \qquad \text{Equation (37)}$$

Figure 12:
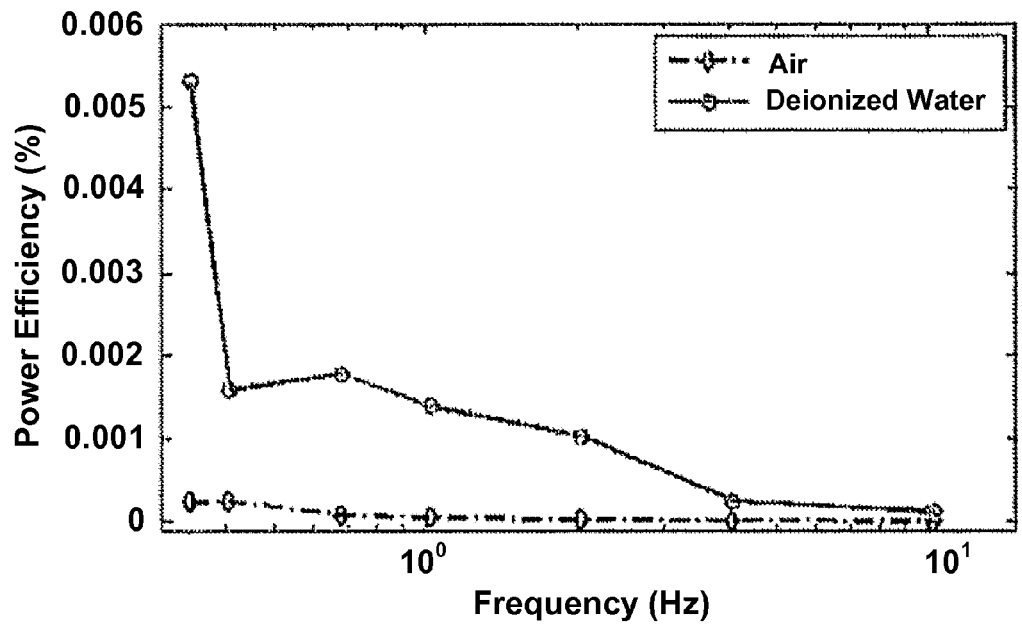
FIG. 12 is an example plot illustrating a comparison of RMS power efficiency of the power cell of FIG. 6 in air and in deionized water.

FIG. 12 is an example plot illustrating comparison of RMS power efficiency of an Ag-based IPMC power cell (such as the IPMC power cell 600) in air and in deionized water. The plot shows that an increase in density of the medium leads to higher deformation and hence higher input power, and output power also increases, leading to higher efficiency of power conversion in water as compared to air. The plot also illustrates that at lower frequencies, power efficiency is higher. Thus, the power cell may be used for tidal and other hydrodynamic energy harvesting applications.

Figure 13:
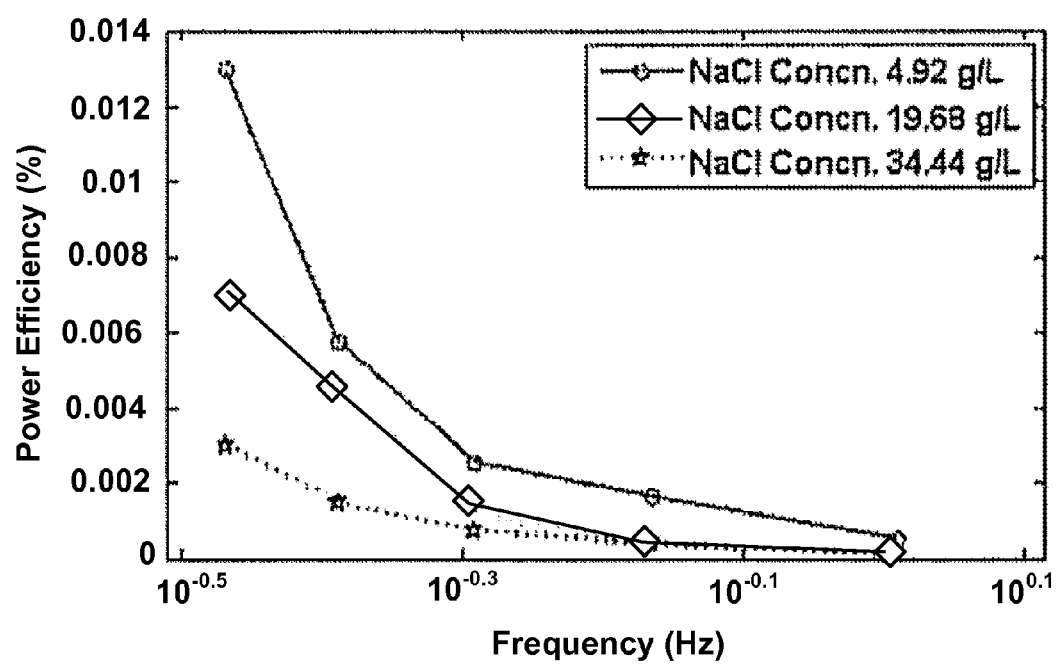
FIG. 13 is an example plot illustrating a comparison of RMS power efficiency of the power cell of FIG. 6 in varying concentrations.

FIG. 13 is an example plot illustrating comparison of RMS power efficiency of an Ag-based IPMC power cell (such as the IPMC power cell 600) in varying NaCl concentrations. The plot illustrates that with increases in the NaCl concentration, efficiency reduces gradually. This may be due to an increase in a number of $Na^+$ ions that block transport channels leading to decreases in efficiency, although input RMS power is more in the case of higher density (higher concentration of NaCl). In addition, an increased presence of $Na^+$ ions can accelerate micro-cracking of metal electrodes and Nafion interfaces leading to further degradation in efficiency over a number of cycles, for example.

In example embodiments, an energy harvesting element is in a form of a flexible thin film, and an area and shape of the film can be designed according to deformation mechanisms and source power intensity.

According to an RMS power input due to fluid induced mechanical deformation, from Equation (36) it can be seen that:

$$P_{in}^{RMS} \propto \frac{L^{10}b^2}{I} = 12\frac{L^9 A}{h^3} \qquad \text{Equation (38)}$$

where L is a length of the membrane, A is a surface area and h is a thickness. Power generated will be approximately directly proportional to the ninth power of length, directly proportional to surface area and inversely proportional to a cube of the thickness. This is a mechanical consideration assuming the membrane is oscillating as a cantilever structure immersed in fluid, for example. There may be other material considerations, such as that an actual charge transport mechanism may be slowed down due to a slow gradient when the thickness (e.g., distance between the surface electrodes) is larger, for example.

Also, a multilayer stack of thin films can be used to prevent high bending forces. A stack of thin films may act as a single homogenous device with outermost surface electrodes that can be actuated using a single source of energy. A stack of thin films will have layers of IPMCs with two separated electrodes such that a current will be added in parallel (with proper arrangement to avoid back-flow into neighboring IPMCs). Alternatively, multiple IPMC power cells may be combined and connected in series. When different devices are connected in series to amplify output voltage, the devices may require many/distributed sources of energy, for example. Use of multiple layers of thin films in an IPMC power cell, or use of multiple IPMC power cell will depend on the application.

In example embodiments, an IPMC coated with an Ag based electrode enhances charge transport under bending load. Results of RMS power efficiency calculations indicate that an efficient conversion of mechanical energy to electrical energy by the IPMCs under cyclic bending deformation depends on morphology of metal electrodes that facilitate charge transport and also on an amount of a competing cluster of ions in the electrolyte medium, for example.

Embodiments described herein may be useful in a wide array of telemedicine applications, for example. Nonconventional body placeable (bending-stretching of the embedded IPMC in open air and room temperature) or implantable sensors (IPMC in fluidic environment) may include small, flexible, long-lasting energy convertors. As other examples, clusters of sensors may be interwoven into textiles for use in shirts, belts, shoes, headgear, and other apparel. Bio-medical implant devices and associated electronic control systems can also be powered using fluidic embedded IPMCs undergoing bending strain due to deformation of organs and limbs in the human body. Due to polymer type base materials, IPMCs can be an integral part of a host structure such as implant, hemodynamic devices, blood flow in arteries, valve, clothing, energy harvesting from pipe flow in sewage environment, pipe flow in home appliances, and several other applications, for example.

Furthermore, where target devices (e.g., wireless devices) need to be powered under low vibration (devices with rotary motion and other moving parts) or in fluidic environments (e.g., in medical implant and diagnostic devices), a flexible polymer based thin film of a desired shape can produce required power from environmental sources of energy. IPMC based energy harvesting systems may be used for applications including tidal wave energy harvesting, residual environmental energy harvesting to power MEMS and NEMS devices, and sensors and actuators for biomedical, aerospace and oceanic applications, for example.

Figure 14:
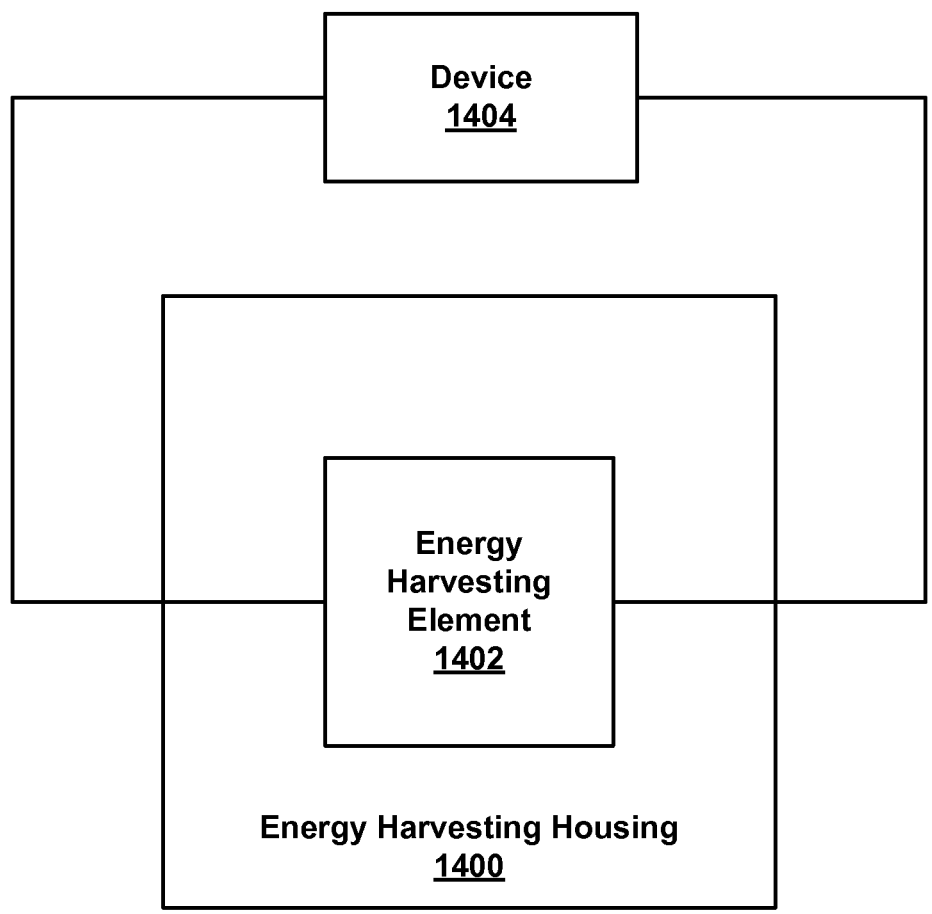
FIG. 14 illustrates an example energy harvesting system.

In an example embodiment, an energy harvesting system may be used to harvest energy from an IPMC. FIG. 14 illustrates an example energy harvesting system. The system may include a structure 1400 housing an energy harvesting element 1402. The structure may be positioned to receive environmentally created vibrations, and may be designed according to a type of environmentally created vibration to be received. The system may further include a device 1404 in communication with the energy harvesting element 1402 to harvest energy. The device 1404 may be any type of device and varies depending on an application of the system. The device 1404 may be connected to the energy harvesting element 1402 through leads, for example.

Figure 15:
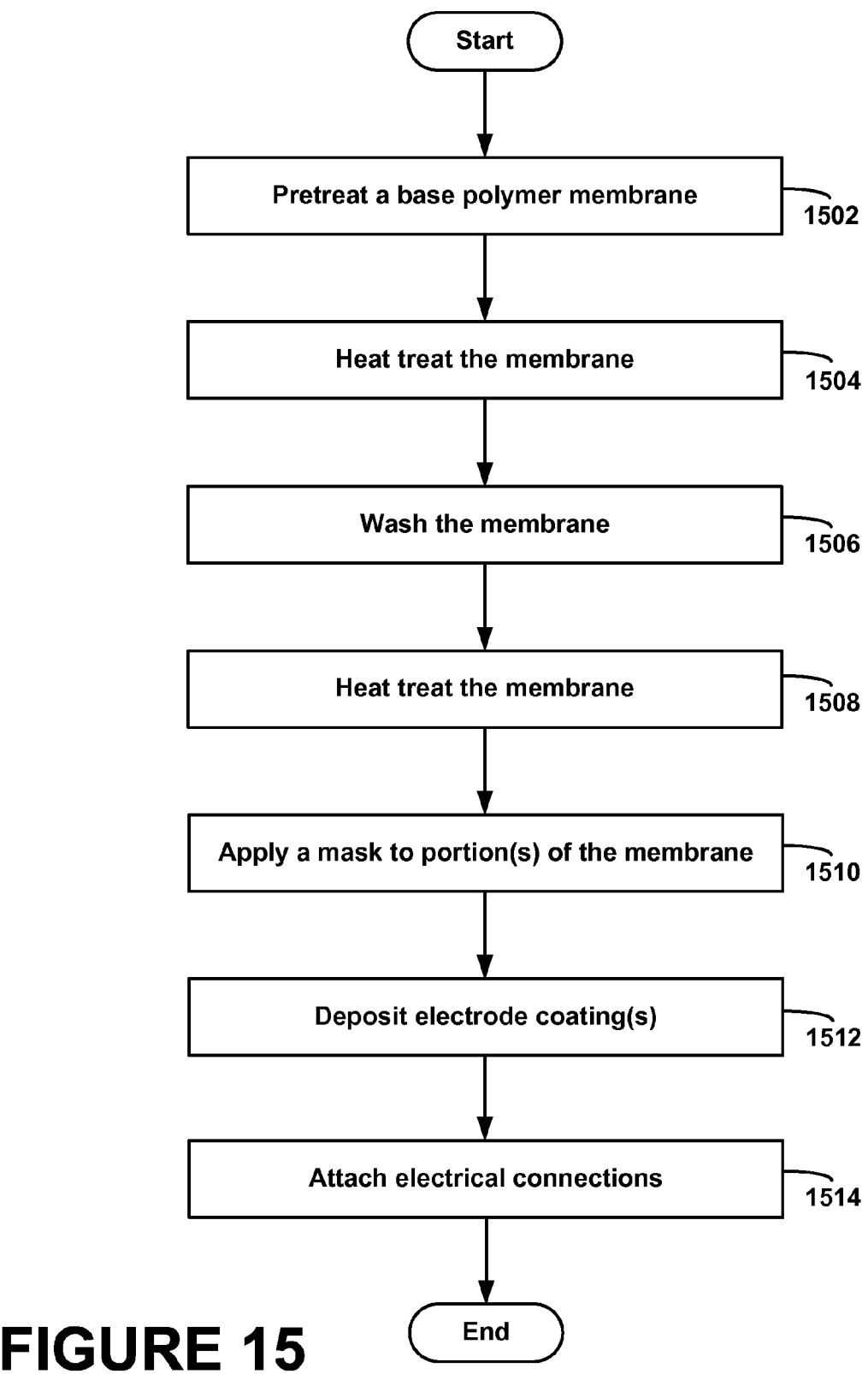
FIG. 15 is a flowchart that depicts example steps of preparing an IPMC power cell.

In example embodiments, a power cell, such an IPMC power cell, may be configured. FIG. 15 is a flowchart that depicts example steps of preparing an IPMC power cell. A base polymer membrane (e.g., such as a Nafion membrane) may be used for the power cell, and can initially be pretreated for surface roughening, as shown at block 1502. For example, emery paper can be used to sand the membrane followed by ultrasonic washing of the membrane to remove any residue. The membrane may then be heat treated (e.g., boiled) in dilute hydrochloric acid (e.g., HCl 2N solution) for approximately 30 minutes, as shown at block 1504, and then washed with deionized water, and shown at block 1506. The membrane can again be boiled in deionized water to further remove any acidic content, as shown at block 1508.

In some embodiments, after the membrane is naturally dried, a thin coating of metal electrodes are coated on either side of the membrane. In addition, the electrode coating may be spaced away from edges of the polymer edges by about 1 to about 4 mm, for example. Thus, during deposition of the electrode, a mask may be placed on the polymer over the edges, and the mask can be removed after application of the electrode, as shown at block 1510. Sides of the polymer may not include any electrode coating.

After the mask is placed, the electrode coating may be deposited, as shown at block 1512. The electrodes may include homogenously dispersed silver nanoparticles (approximately 60% by weight) into polystyrene resin and a conductive hardener. For example, the silver electrode may be dispersed on the polymer surface using a soft brush to ensure a uniform and consistent layer on the surface. Other methods of dispersion may include sol-gel methods, dip coating, sputtering, inkjet printing, or spin-coating, for example. Using a homogenously method of electrode deposition may result in better binding between the electrode and the base polymer as compared to what can be achieved using sputtering and electro-chemical deposition methods, for example. The binding between an electrode (e.g., the silver coating) and the polymer (e.g., the Nafion membrane) can be achieved using this dispersion process.

A composition of the silver electrode may be in the range of about 40% to about 100% silver by weight, for example. Using pure silver (e.g., about 100%) may provide low mechanical stability and low hydration. Alternatively, using less than 100%, or about 40% or lower silver by weight may provide a predominantly polystyrene based mechanical backbone with good hydration and lesser charge collecting performance. An amount of silver by weight in the electrode may depend on an application and a desired power output.

Subsequently, electrical leads or connection points may be included on the electrode coating, as shown at block 1514, to enable attachment of devices to the IPMC power cell so as to harvest energy created by the IPMC power cell, for example.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An energy harvesting device comprising:
   an ionic polymer-metal composite (IPMC) thin film including a first and a second surface;
   a metal electrode coupled to one of the first and the second surface, wherein the metal electrode includes silver particles; and
   a graphitic coating coupled to a portion of one of the first and the second surface.

2. The energy harvesting device of claim 1, wherein the metal electrode is coupled to the first surface and the energy harvesting device further comprises a second metal electrode coupled to the second surface, wherein both the metal electrode and the second metal electrode include silver particles.

3. The energy harvesting device of claim 2, wherein the silver particles are deposited on both the metal electrode and the second metal electrode to form coatings.

4. The energy harvesting device of claim 2, wherein the silver particles are homogenously dispersed in the metal electrode and the second metal electrode.

5. The energy harvesting device of claim 2, wherein the IPMC thin film includes fixed anions and mobile cations, and wherein when the IPMC thin film is hydrated, the mobile cations diffuse toward one of the metal electrode and the second metal electrode via channels provided by the fixed anions to generate the electric potential between the metal electrode and the second metal electrode.

6. The energy harvesting device of claim 2, wherein when the IPMC thin film is subjected to a bending motion, an electric potential develops between the metal electrode and the second metal electrode.

7. The energy harvesting device of claim 6, further comprising an energy collector connected to the IPMC thin film to collect energy generated by the IPMC thin film.

8. The energy harvesting device of claim 1, wherein the silver particles are included in a coating that is coupled to the metal electrode.

9. The energy harvesting device of claim 1, wherein the coating covers a portion of the metal electrode.

10. The energy harvesting device of claim 1, wherein the silver particles are dispersed in the metal electrode.

11. The energy harvesting device of claim 1, wherein the IPMC thin film includes one or more channels lengthwise along the IPMC thin film, and wherein the metal electrode including the silver particles is included in the one or more channels of the IPMC thin film on one of the first and the second surface.

12. The energy harvesting device of claim 1, wherein the metal electrode includes an amount of silver in a range of about 40% to about 100% silver by weight.

13. The energy harvesting device of claim 1, wherein the IPMC includes a base polymer Nafion.

14. The energy harvesting device of claim 1, wherein the IPMC thin film includes a polystyrene polymer.

15. The energy harvesting device of claim 1, wherein the IPMC thin film is a rectangular shape, and wherein the first and the second surfaces are opposing substantially planar surfaces along a length of the IPMC thin film extending from a first end to a second end.

16. The energy harvesting device of claim 1, wherein the metal electrode is coupled to the first surface and the graphitic coating is coupled to the second surface.

17. The energy harvesting device of claim 1, wherein the silver particles are nanoparticles, and wherein the metal electrode includes an amount of silver in a range of about 40% to about 100% silver by weight.

18. A method comprising:
depositing a silver particle electrode coating on one of a first surface and a second surface of an ionic polymer-metal composite (IPMC) thin film; and
providing a graphitic coating coupled to the second surface.

* * * * *

UNITED STATES PATENT AND TRADEMARK OFFICE
CERTIFICATE OF CORRECTION

PATENT NO. : 8,508,108 B2
APPLICATION NO. : 13/161218
DATED : August 13, 2013
INVENTOR(S) : Anand et al.

Page 1 of 1

It is certified that error appears in the above-identified patent and that said Letters Patent is hereby corrected as shown below:

On Title Page 2, Item (56), under "OTHER PUBLICATIONS", in Column 1, Line 9, delete "polymermetal" and insert -- polymer-metal --, therefor.

On Title Page 2, Item (56), under "OTHER PUBLICATIONS", in Column 2, Line 16, delete "composites,"IISc" and insert -- composites," IISc --, therefor.

On Title Page 2, Item (56), under "OTHER PUBLICATIONS", in Column 2, Line 21, delete "harvesting,", Proc." and insert -- harvesting," Proc. --, therefor.

On Title Page 2, Item (56), under "OTHER PUBLICATIONS", in Column 2, Line 27, delete "Potential,and" and insert -- Potential, and --, therefor.

In the Specification

In Column 3, Line 36, delete "IMPCs" and insert -- IPMCs --, therefor.

In Column 5, Line 30, delete "polymer 108," and insert -- polymer 110, --, therefor.

In Column 5, Line 32, delete "polymer 108" and insert -- polymer 110 --, therefor.

In Column 7, Lines 16-17, delete "(C+-C⁻)F." and insert -- $(C^{+}-C^{-})F$. --, therefor.

In Column 8, Line 13, delete "1'," and insert -- l', --, therefor.

In Column 8, Line 42, delete "1'," and insert -- l', --, therefor.

In Column 10, Line 55, delete "IPMC's" and insert -- IPMCs --, therefor.

In Column 13, Line 14, delete "cell 300" and insert -- cell 600 --, therefor.

Signed and Sealed this
Sixth Day of May, 2014

Michelle K. Lee
*Deputy Director of the United States Patent and Trademark Office*